United States Patent
Ishii et al.

(10) Patent No.: US 6,696,923 B2
(45) Date of Patent: Feb. 24, 2004

(54) METHOD AND A SYSTEM FOR REDUCING THE INFLUENCE OF DISTURBING SIGNALS IN TRANSPONDER APPLICATIONS

(75) Inventors: Takamasa Ishii, Ponte Capriasca (CH); Peter Stegmaier, Ponte Capriasca (CH); Jean-Marc Jobin, Pura (CH)

(73) Assignee: Datamars SA (CH)

( * ) Notice: Subject to any disclaimer, the term of this patent is extended or adjusted under 35 U.S.C. 154(b) by 478 days.

(21) Appl. No.: 09/801,154

(22) Filed: Mar. 7, 2001

(65) Prior Publication Data
US 2001/0048360 A1 Dec. 6, 2001

(30) Foreign Application Priority Data
Mar. 13, 2000 (EP) .............................................. 00810205

(51) Int. Cl.[7] .................................................. H04Q 5/22
(52) U.S. Cl. .................. 340/10.2; 340/10.4; 340/10.41; 340/539.1; 340/10.42; 340/10.51; 375/285; 375/296; 375/346; 375/347; 375/349; 375/219; 375/299; 375/267; 455/103; 455/132; 455/137; 455/273; 455/277.2; 455/278.1; 455/296; 455/63.1
(58) Field of Search ............................. 340/10.2, 10.4, 340/10.41, 539.1, 10.42, 10.51; 375/285, 296, 346, 347, 349, 219, 299, 267; 455/103, 132, 137, 296, 273, 277.2, 278.1, 63.1, 101, 138

(56) References Cited

U.S. PATENT DOCUMENTS

| | | | | |
|---|---|---|---|---|
| 5,046,133 A | * | 9/1991 | Watanabe et al. | ............ 455/138 |
| 5,537,105 A | * | 7/1996 | Marsh et al. | ............. 340/10.32 |
| 6,466,771 B2 | * | 10/2002 | Wood, Jr. | .................... 455/101 |

FOREIGN PATENT DOCUMENTS

EP   0331411   9/1989   ...................... 1/12

OTHER PUBLICATIONS

Patent Abstract of Japan No. 62005736 dated Jan. 12, 1987.
Patent Abstract of Japan No. 62049728 dated Mar. 4, 1987.

* cited by examiner

*Primary Examiner*—Michael Horabik
*Assistant Examiner*—Yves Dalencourt
(74) *Attorney, Agent, or Firm*—Ostrolenk, Faber, Gerb & Soffen, LLP

(57) ABSTRACT

In a transponder application, at least one transponder and at least one interrogating reader, the reader has at least two receiving units so disposed, for instance at different distances, relatively to the transponder, that signals from the same are received at different levels by the receiving units. By combination, e.g. by subtraction, of the received signals, disturbing signals received at practically the same level are eliminated while the difference of useful transponder signals is available. This substantially improves system performance in transponder applications and allows to increase the operating distance between reader and transponder.

14 Claims, 1 Drawing Sheet

METHOD AND A SYSTEM FOR REDUCING THE INFLUENCE OF DISTURBING SIGNALS IN TRANSPONDER APPLICATIONS

BACKGROUND OF THE INVENTION

The invention relates to a method for reducing the effect of disturbance signals in a system including a transponder and a reader.

The invention further relates to an identification system comprising at least one transponder and at least one reader.

Transponders are electronic circuits containing information used for identification of animals, for identification of any type of object, for attaching dedicated information to any type of item in logistics processes, etc. Transponders are used in combination with a reader device which communicates with said transponder and makes the information stored in the transponder available to the user of said information. In certain cases there is also the possibility that said reader device sends information to the transponder, where said information may also be stored in the transponder memory (Read-Write systems, etc.). Typically, transponders have little energy at their disposal for internal handling of their information (e.g. read/write operations) and for transmitting the required information to the interrogating reader device: So-called active transponders have an internal energy source (a battery or the like) which, however, usually is quite small due to size, weight and cost restrictions, while so-called passive transponders do not have an internal energy source but make use of the energy of the interrogating field.

While the problem solved with this invention is of prime interest for passive transponders, also active transponders may benefit: Due to the very limited energy received by the interrogating reader from a transponder, a consequence of the above outlined internal energy restriction within the transponder, the reception of the information transmitted by the transponder is prone to be disturbed by sources of disturbance in the environment of an interacting system comprising a transponder and a reader. If the frequency of a disturbing signal is very close or even identical with the frequency of the signal provided by the transponder to transmit information to the interrogating reader, the reader may not be able to properly assess this information. Since the energy level of the signal received by the interrogating reader from the transponder is rather low, reception of such a signal can easily be disturbed even by relatively weak disturbance sources. In real world applications such a disturbance often significantly decreases the achievable reading distance between transponder and reading device, sometimes even down to almost zero, thereby heavily compromising the transponder system performance.

SUMMARY OF THE INVENTION

In view of the foregoing the main aim of the instant invention is to provide a method and a system for substantially reducing the negative effect of disturbance signals on the operation of a system comprising a transponder and a reader.

According to a first aspect of the invention this aim is attained with a method comprising emitting a signal from the transponder, receiving the signal emitted by the transponder in a reader having a first receiving unit and having a second receiving unit, wherein the energy levels of the transponder signals which are received by the first and second receiving units are substantially different. A disturbance signal emitted by a disturbance source is received by both of the first and second receiving units. The energy levels of the disturbance signals which are received by the first and second receiving units are substantially the same. Based on the foregoing, a first output signal is provided from the first receiving unit and a second output signal is provided from the second receiving unit. Each of the first and the second output signals comprises a transponder signal component and a disturbance signal component. The output signals of the first and second receiving units are combined, thereby generating a third output signal, which comprises a transponder signal component which is much larger than a disturbance signal component of the third output signal.

According to a second aspect of the invention this aim is achieved using an apparatus which performs the method, including at least one transponder which emits a transponder signal, at least one reader having at least a first and second receiving unit, each for receiving the transponder signal and each of the receiving units is also able to receive a disturbance signal that is emitted by a disturbance source. The receiving units are so arranged with respect to the transponder that the energy levels of the transponder signals received by the first and second receiving units are substantially different. The receiving units are arranged with respect to the disturbance source so that the energy levels of the disturbance signals which are received by the first and second receiving units are substantially the same. The first receiving unit provides a first output signal and the second receiving unit provides a second output signal. Each of the first and second output signals comprises a transponder signal component and a disturbance signal component. There are means for combining the output signals of the first and second receiving units for generating a third output signal comprising a transponder signal component, which is much larger than a disturbance signal component. The receiving units may comprise coils, and their windings and the mode of attachment determine how they perform with respect to each other.

DESCRIPTION OF A PREFERRED EMBODIMENT

The main advantage of the invention is that it makes possible to practically eliminate the influence of disturbing signals, to improve substantially the performance of a transponder reader system, and to increase the operating distance between reader and transponder in such a system.

DESCRIPTION OF A PREFERRED EMBODIMENT

Figure 1:
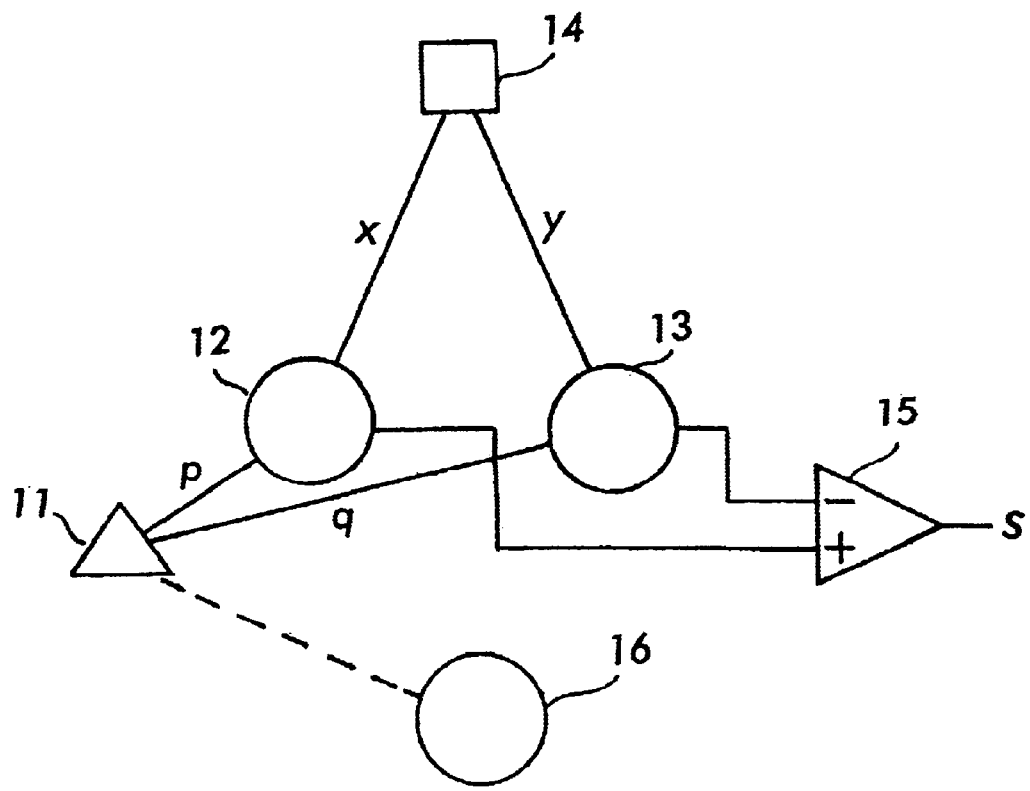
FIG. 1 schematically shows an embodiment of the invention.

FIG. 1 schematically shows a preferred embodiment of the invention, wherein a transponder 11 is apt to emit a transponder signal X and to communicate with an interrogating reader which comprises two receiving units 12 respectively 13 of similar or identical design. The lines connecting transponder 11 to receiving units 12, 13 represent the transmission links between them and the letters p, q represent the respective transmission function coefficients.

Each of receiving units 12, 13 comprises or consists substantially of a coil antenna. The coil antennas of receiving units 12, 13 are for instance located at different distances from transponder 11.

In FIG. 1 block 14 represents a source 14 of a noise or disturbance signal N. The lines connecting disturbance source 14 to receiving units 12, 13 represent the transmission links between them and the letters x, y represent the respective transmission function coefficients.

Source 14 is assumed to be located at a much greater distance or at a different angle from receiving units 12 and 13 of the reader. For this reason x is approximately equal to y, and therefore the energy levels of the disturbance signals xN respectively yN which are received by both receiving units are substantially the same.

Within the context of this description the term "transponder signal" means the signal emitted by a single transponder or by a plurality of transponders.

Since the receiving units 12, 13 are located at different distances from transponder 11, p is larger or much larger than q, and therefore the energy levels of the transponder signals pX respectively qX which are received by receiving units 12 respectively 13 are substantially different.

Receiving unit 12 provides a first output signal U12. Receiving unit 13 provides a second output signal U13. Output signals U12 respectively U13 comprise each a transponder signal component, pX respectively qX, and a disturbance signal component, xN respectively yN. As can be appreciated from FIG. 1 output signals U12 respectively U13 are combined in a suitable way, e.g. by connecting the outputs of receiving units 12, 13 to respective inputs of e.g. a summing amplifier 15 in order to generate a third output signal S which comprises a transponder signal component which is much larger than a disturbance signal component of output signal S. This is achieved e.g. by forming the difference of output signals U12 and U13. Thereby the disturbance signal component of output signal S is practically canceled (xN−yN≈0 for x≈Ψ), whereas the transponder signal component (pX−qX>mX with p>q) of output signal S is large enough for suitable operation of the transponder reader system. Output signal S thus has a maximal ratio of transponder-signal level to disturbance signal level.

The energy source for the transponder—a battery in the case of active transponders or the energizing field of the reading device in the case of passive transponders—is not discussed here.

Depending on the specific implementation of the system, an amplitude and/or phase correction of the output signals of receiving units 12, 13 may be suitable or necessary.

If the phase of the output signals of receiving units 12, 13 does not differ much, the effect of the invention is always in favor of the transponder signal and decreases disturbances. If pX/xN is greater than qX/yN, then (pX+xN)−((qX+yN)*A) with A being an amplitude correction factor, then A can be adjusted, preferably by a suitable control system, in order to decrease the effect of disturbance signal by bringing Nx and Ny in the same order of magnitude in level. Even if the performance of the two receiving units and/or the distance x and y are different, the disturbance can be reduced by adjusting amplitude factor A, where factor A may also be <1.

As the transponder signals pX and qX received by receiving units 12, 13 may be different in phase and as the receiving units 12, 13 may introduce different phase relationships due to different quality factors, different inductance, different filters, etc., it may be advisable to adjust the phase relationship between receiving units 12, 13 or to make this phase relationship adjustable for maximum suppression of the disturbance signal component of output signal S and for maximum useful transponder signal component of output signal S respectively.

Amongst the various possible designs of receiving units, the use of coil antennas is preferred. Similar coils wound in the same direction may be used connected in series or parallel with opposite polarity or coils wound in opposite directions may directly be connected together in series or parallel, or a coil wound in the shape of an 8 (eight) with identical loops may be used, wherein the signals received by the loops are subtracted. Of course, the subtraction together with any correction such as phase correction or amplitude adjustment may be effected by electronic means of the reader.

In a more general representation of a system according to the invention, the reader of the system according to FIG. 1 may include one or more transmitting units 16 which provide the necessary signals to activate, energize and/or control the operation of transponder 11. In a preferred embodiment the one or more transmitting units are used only for transmission, but not for reception. Transponder 11 can be a single transponder or can be formed by a group of transponders.

What is claimed is:

1. A method for reducing the effect of disturbance signals in a system including a transponder and a reader, said method comprising:

emitting a signal from the transponder receiving the signal emitted by the transponder in a reader having a first receiving unit and a second receiving unit, wherein the energy levels of the transponder signals which are received by said first and second receiving units are substantially different, receiving a disturbance signal emitted by a disturbance source by both of said first and second receiving units, wherein the energy levels of the disturbance signals which are received by said first and second receiving units are substantially the same, providing a first output signal from said first receiving unit and providing a second output signal from said second receiving unit, wherein each of said first and second output signals comprising a transponder signal component and a disturbance signal component, and combining said output signals of said first and second receiving units for generating a third output signal, said third output signal comprising a transponder signal component which is much larger than a disturbance signal component of said third output signal.

2. A method according to claim 1, further comprising correcting said output signals of said first and said second receiving units for phase difference for optimizing the suppression of the disturbance signal component of said third output signal.

3. A method according to claim 2, further comprising adjusting said output signals of said first and said second receiving units for amplitude difference for optimizing the suppression of the disturbance signal component of said third output signal.

4. A method according to claim 1, wherein said third output signal is generated by subtracting the output signal of one of said receiving units from the output signal of the other said receiving unit.

5. A method according to claim 1, wherein said first and said second receiving units are so configured that their respective said output signals are of opposite polarity, and wherein these output signals are combined by being added.

6. A method according to claim 1, wherein the reader comprises more than two receiving units for reception of transponder signals and one or more transmitting units.

7. A method according to claim 1, wherein the reader comprises more than one transmitting unit for transmission of energizing signals.

8. A method according to claim 1, further comprising modulating the energizing signal or signals for transmission of data from the reader to the transponder.

9. A method according to claim 3, comprising automatically adjusting an optimal ratio of the output signals provided by the receiving units in order to maximize the signal-to-noise ratio of said third output signal.

10. An identification system comprising
- at least one transponder which is able to emit a transponder signal,
- at least one reader having at least a first and a second receiving unit, each receiving unit being able to receive said transponder signal,
- each of said receiving units being also able to receive a disturbance signal emitted by a disturbance source,
- said receiving units being so arranged with respect to said transponder that the respective energy levels of the transponder signals which are received by said first and second receiving units are substantially different,
- said receiving units being so arranged with respect to said disturbance source that the energy levels of the disturbance signals which are received by said first and second receiving units are substantially the same,
- said first receiving unit providing a first output signal and said second receiving unit providing a second output signal,
- each of said first and second output signals comprising a transponder signal component and a disturbance signal component, and
- means for combining said output signals of said first and second receiving units for generating a third output signal comprising a transponder signal component which is much larger than a disturbance signal component.

11. A system according to claim 10, wherein each of said two receiving units comprises a coil, the coils of both receiving units are similar, the coil of one of the receiving units clockwise and the coil of the other receiving unit being wound counterclockwise and the coils being connected in series or parallel such that the combination of the output signals of the receiving units is obtained.

12. A system according to claim 10, wherein each of the two receiving units comprises a coil, the coils of both receiving units being similar, wound clockwise or counterclockwise, connected in series or parallel, and being so configured that the output signals delivered by the receiving units are of opposite polarity.

13. A system according to claim 10, wherein the two receiving units comprise one coil which is wound in a shape of an 8 in order to divide said one coil into two coils adapted to provide output signals having a phase difference of 180 degrees between them.

14. A method according to claim 1, further comprising adjusting said output signals of said first and said second receiving units for amplitude difference for optimizing the suppression of the disturbance signal component of said third output signal.

* * * * *